US012705338B2

(12) United States Patent
Zheng

(10) Patent No.: US 12,705,338 B2
(45) Date of Patent: Aug. 11, 2026

(54) MOBILE-TERMINAL ASPECT-ORIENTED SECURITY PROTECTION METHODS AND APPARATUSES, STORAGE MEDIA, AND ELECTRONIC DEVICES

(71) Applicant: Alipay (Hangzhou) Information Technology Co., Ltd., Hangzhou (CN)

(72) Inventor: Min Zheng, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 60 days.

(21) Appl. No.: 18/980,126

(22) Filed: Dec. 13, 2024

(65) Prior Publication Data

US 2025/0111040 A1 Apr. 3, 2025

Related U.S. Application Data

(63) Continuation of application No. PCT/CN2023/127165, filed on Oct. 27, 2023.

(30) Foreign Application Priority Data

Dec. 14, 2022 (CN) ........................ 202211610851.9

(51) Int. Cl.
*G06F 21/54* (2013.01)

(52) U.S. Cl.
CPC ........ *G06F 21/54* (2013.01); *G06F 2221/033* (2013.01)

(58) Field of Classification Search
CPC ............... G06F 21/54; G06F 2221/033; G06F 2221/034; G06F 2221/2107; G06F 21/121;

(Continued)

(56) References Cited

U.S. PATENT DOCUMENTS 7,823,205 B1 * 10/2010 Isenberg ............... G06F 21/577 726/25
2013/0179991 A1 * 7/2013 White ..................... G06F 21/53 726/29

(Continued)

FOREIGN PATENT DOCUMENTS

CN 103544046 A 1/2014
CN 106295262 A 1/2017

(Continued)

OTHER PUBLICATIONS

Ant Technology Group Co Ltd et al., "Safe Parallel Sectioning White Paper," ITSTEC, Dec. 2021, 172 pages (with machine translation).

(Continued)

*Primary Examiner* — Javier O Guzman
(74) *Attorney, Agent, or Firm* — Fish & Richardson P.C.

(57) ABSTRACT

This application relates to methods, storage media, and apparatuses. A virtual machine is disposed on a mobile terminal and is configured to run aspect-oriented security on the mobile terminal. In an example method, after a service application program installed on the mobile terminal is started, the virtual machine determines whether the aspect-oriented security on the mobile terminal satisfies a secure running condition. If yes, the virtual machine acquires an encrypted aspect configuration, decrypts the encrypted aspect configuration, and injects an aspect program into the service application program based on the decrypted aspect configuration by using a predetermined aspect base to execute an aspect-oriented security service by using the aspect program. Otherwise, the virtual machine exits the service application program.

20 Claims, 1 Drawing Sheet

(58) Field of Classification Search
CPC ...... G06F 21/53; G06F 21/6209; G06F 21/64; G06F 21/602
See application file for complete search history.

(56) References Cited

U.S. PATENT DOCUMENTS

| | | | | |
|---|---|---|---|---|
| 2013/0312058 | A1* | 11/2013 | Thompson | G06F 21/54 726/1 |
| 2017/0364686 | A1* | 12/2017 | Stafford | G06F 8/65 |
| 2018/0046804 | A1* | 2/2018 | Lee | G06F 21/57 |
| 2021/0319095 | A1* | 10/2021 | Whitmore | G06F 21/554 |
| 2021/0329032 | A1* | 10/2021 | Shaw | H04L 63/1425 |

FOREIGN PATENT DOCUMENTS

| | | | | |
|---|---|---|---|---|
| CN | 113779578 A | | 12/2021 | |
| CN | 115102720 A | | 9/2022 | |
| CN | 115186270 A | * | 10/2022 | G06F 21/577 |
| CN | 116127413 A | | 5/2023 | |
| WO | WO-2015138931 A1 | * | 9/2015 | G06F 21/52 |

OTHER PUBLICATIONS

International Preliminary Report on Patentability in International Appln. No. PCT/CN2023/127165, mailed on Jun. 26, 2025, 14 pages (with English translation).

International Search Report and Written Opinion in International Appln. No. PCT/CN2023/127165, mailed on Jan. 6, 2024, 17 pages (with English translation).

De Win et al., "How Secure is AOP and What can we Do about it?," Paper, Presented at the ICSE06: International Conference on Software Engineering Shanghai, China, May 20-21, 2006; SESS '06: Proceedings of the 2006 international workshop on Software engineering for secure systems, ACM, May 20, 2006, pp. 27-33.

Extended European Search Report in European Appln. No. 23902307.0, mailed on Sep. 19, 2025, 9 pages.

* cited by examiner

MOBILE-TERMINAL ASPECT-ORIENTED SECURITY PROTECTION METHODS AND APPARATUSES, STORAGE MEDIA, AND ELECTRONIC DEVICES

CROSS-REFERENCE TO RELATED APPLICATIONS

This application is a continuation of PCT Application No. PCT/CN2023/127165, filed on Oct. 27, 2023, which claims priority to Chinese Patent Application No. 202211610851.9, filed on Dec. 14, 2022, and each application is hereby incorporated by reference in its entirety.

TECHNICAL FIELD

This application relates to the field of aspect-oriented security protection technologies, and more specifically, to mobile-terminal aspect-oriented security protection methods and apparatuses, storage media, and electronic devices.

BACKGROUND

Aspect-oriented security is a systematic idea of applying an aspect-oriented programming (AOP) idea to secure system construction, constructing a secure parallel space (a parallel cabin) orthogonally integrated with a service, and implementing security protection with a higher dimension when normal logic of a service is not modified.

Aspect-oriented security on a mobile terminal is a super control framework on the mobile terminal. Security defense of aspect-oriented security is very important. A server application runs on a controllable server. Differently, the aspect-oriented security on the mobile terminal runs on a terminal device of a user. A running environment is untrusted.

Therefore, how to ensure that the aspect-oriented security on the mobile terminal is not attacked on the mobile terminal is a technical problem urgently to be resolved by a person skilled in the art.

SUMMARY

A purpose of this application is to provide a mobile-terminal aspect-oriented security protection method, to prevent aspect-oriented security on a mobile terminal from being attacked on the mobile terminal.

For the foregoing purpose, one aspect of this application provides a mobile-terminal aspect-oriented security protection method. The method is applied to a virtual machine disposed on a mobile terminal. The virtual machine is configured to run aspect-oriented security on the mobile terminal. The method includes the following steps: after a service application program installed on the mobile terminal is started, determining, by the virtual machine, whether the aspect-oriented security on the mobile terminal satisfies a secure running condition; and if yes, acquiring an encrypted aspect configuration, decrypting the encrypted aspect configuration, and injecting an aspect program into the service application program based on the decrypted aspect configuration by using a predetermined aspect base, to execute an aspect-oriented security service by using the aspect program; or otherwise, exiting the service application program.

Further, in some implementations, the determining, by the virtual machine, whether the aspect-oriented security on the mobile terminal satisfies a secure running condition specifically includes: performing, by using the virtual machine, integrity check on the aspect-oriented security on the mobile terminal, where if the check succeeds, the aspect-oriented security on the mobile terminal satisfies the secure running condition; or otherwise, the aspect-oriented security on the mobile terminal does not satisfy the secure running condition.

Further, in some implementations, the determining, by the virtual machine, whether the aspect-oriented security on the mobile terminal satisfies a secure running condition specifically includes: determining, by the virtual machine, whether the mobile terminal encounters jailbreak/ROOT, and/or determining whether injection/HOOK occurs on the aspect-oriented security on the mobile terminal, where if yes, the aspect-oriented security on the mobile terminal satisfies the secure running condition; or otherwise, the aspect-oriented security on the mobile terminal does not satisfy the secure running condition.

Further, in some implementations, after the aspect program is injected into the service application program, the method further includes: performing regular check on an object corresponding to the decrypted aspect configuration, and determining whether the object is tampered with; and if yes, exiting the service application program; or otherwise, enabling the aspect program to continue to execute the aspect-oriented security service.

Further, in some implementations, the performing regular check on an object corresponding to the decrypted aspect configuration, and determining whether the object is tampered with specifically includes: performing regular comparison between a hash value of the object corresponding to the decrypted aspect configuration and a pre-stored standard hash value, where if the two hash values match, the object is not tampered with; or otherwise, the object is tampered with.

Further, in some implementations, after the aspect program is injected into the service application program, the method further includes: tracing a stack called by using the aspect program, and determining whether the aspect program is hijacked when executing the aspect-oriented security service; and if yes, exiting the service application program; or otherwise, enabling the aspect program to continue to execute the aspect-oriented security service.

Another purpose of this application is to provide a mobile-terminal aspect-oriented security protection apparatus, to prevent aspect-oriented security on a mobile terminal from being attacked on the mobile terminal.

Based on the foregoing objective, another aspect of this application provides a mobile-terminal aspect-oriented security protection apparatus. The mobile-terminal aspect-oriented security protection apparatus is disposed in a virtual machine on a mobile terminal. The virtual machine is configured to run aspect-oriented security on the mobile terminal. The apparatus includes: a determining module, configured to: after a service application program installed on the mobile terminal is started, determine, by using the virtual machine, whether the aspect-oriented security on the mobile terminal satisfies a secure running condition; a start module, configured to: when a determining result of the determining module is yes, acquire an encrypted aspect configuration, decrypt the encrypted aspect configuration, and inject an aspect program into the service application program based on the decrypted aspect configuration by using a predetermined aspect base, to execute an aspect-oriented security service by using the aspect program; and an exit module, configured to: when the determining result of the determining module is no, exit the service application program.

Further, in some implementations, determining, by the virtual machine, whether the aspect-oriented security on the mobile terminal satisfies the secure running condition specifically includes: performing, by using the virtual machine, integrity check on the aspect-oriented security on the mobile terminal, where if the check succeeds, the aspect-oriented security on the mobile terminal satisfies the secure running condition; or otherwise, the aspect-oriented security on the mobile terminal does not satisfy the secure running condition.

Further, in some implementations, determining, by the virtual machine, whether the aspect-oriented security on the mobile terminal satisfies the secure running condition specifically includes: determining, by the virtual machine, whether the mobile terminal encounters jailbreak/ROOT, and/or determining whether injection/HOOK occurs on the aspect-oriented security on the mobile terminal, where if yes, the aspect-oriented security on the mobile terminal satisfies the secure running condition; or otherwise, the aspect-oriented security on the mobile terminal does not satisfy the secure running condition.

Further, in some implementations, the start module is further configured to: after the aspect program is injected into the service application program, perform regular check on an object corresponding to the decrypted aspect configuration, and determine whether the object is tampered with; and if yes, exit the service application program; or otherwise, enable the aspect program to continue to execute the aspect-oriented security service.

Further, in some implementations, performing regular check on the object corresponding to the decrypted aspect configuration, and determining whether the object is tampered with specifically includes: performing regular comparison between a hash value of the object corresponding to the decrypted aspect configuration and a pre-stored standard hash value, where if the two hash values match, the object is not tampered with; or otherwise, the object is tampered with.

Further, in some implementations, the start module is further configured to: after the aspect program is injected into the service application program, trace a stack called by using the aspect program, and determine whether the aspect program is hijacked when executing the aspect-oriented security service; and if yes, exit the service application program; or otherwise, enable the aspect program to continue to execute the aspect-oriented security service.

Still another purpose of this application is to provide a storage medium storing a computer program. When the computer program is executed in a computer, the computer is enabled to perform steps in the above-mentioned mobile-terminal aspect-oriented security protection method.

Still another purpose of this application is to provide an electronic device including a memory and a processor. The memory stores executable code. When the processor executes the executable code, the processor performs steps in the above-mentioned mobile-terminal aspect-oriented security protection method.

According to the mobile-terminal aspect-oriented security protection methods and apparatuses in this application, the virtual machine is used to determine whether the aspect-oriented security on the mobile terminal satisfies the secure running condition, start the aspect-oriented security on the mobile terminal when the secure running condition is satisfied, and not start the aspect-oriented security on the mobile terminal and exit the service application program when the secure running condition is not satisfied, to prevent the aspect-oriented security on the mobile terminal and the service application program from being attacked. The aspect configuration is changed from a plaintext to an encrypted ciphertext. The virtual machine is used to decrypt the encrypted ciphertext. As such, the following case is avoided: The plaintext aspect configuration is illegally called in an operating system by an attacker. Whether the aspect program is hijacked or whether the object corresponding to the encrypted aspect configuration is tampered with is regularly determined, to protect the aspect-oriented security on the mobile terminal during running.

DESCRIPTION OF EMBODIMENTS

Figures 1, 2:
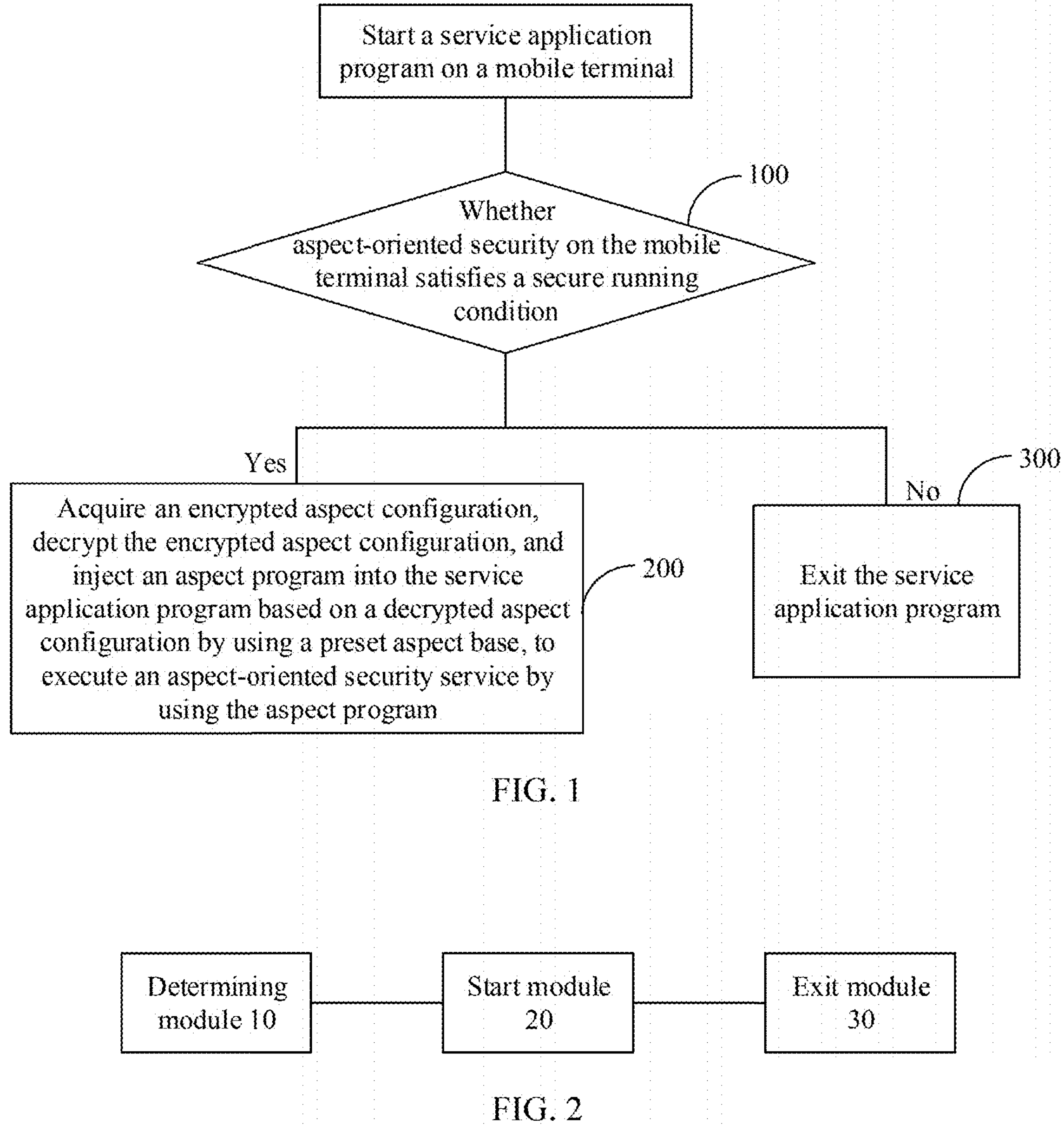
FIG. 1 is a flowchart illustrating a mobile-terminal aspect-oriented security protection method, according to an embodiment of this application.
FIG. 2 is a structural block diagram illustrating a mobile-terminal aspect-oriented security protection apparatus, according to another embodiment of this application.

The following provides and describes example embodiments of this application with reference to the accompanying drawings in detail.

Aspect-oriented security (or a parallel aspect-oriented security) is a method for dynamically modifying or adding an aspect program used for implementing an aspect-oriented security service to running logic of a service application program in an aspect-oriented programming (AOP) manner, without modifying the service application program. As such, when the aspect-oriented security service is implemented, a program for implementing the aspect-oriented security service is decoupled from the service application program, thereby avoiding a development iteration problem caused due to high coupling.

The aspect program herein is an enhanced program for implementing the aspect-oriented security service based on service running logic. The aspect program can be injected from a corresponding injection point of the service application program in the aspect-oriented programming manner. The aspect program is triggered to be executed in a process of executing the service application program, to implement a needed aspect-oriented security service function.

When the service application program executes a service, the service application program usually executes the service through calls between methods. Therefore, any method in the service application program can be used as an injection point of the aspect program, that is, the above-mentioned entry point. The aspect program is injected from a corresponding injection point. When the service application program performs execution to the injection point, that is, calls a method of the service application program corresponding to the injection point, the aspect program injected from the injection point is executed.

Generally, there is high reusability of code responsible for a process of injecting the aspect program from the injection point. Therefore, the program implementing this process is usually abstracted as a service module, that is, an aspect base. The aspect base can acquire, from a server providing the aspect-oriented security service, the aspect program that needs to be deployed, and acquire the injection point at which the aspect program is injected into the service application program. After an application container is started, the aspect base is woken up, and the corresponding aspect program is injected from the injection point of the service application program.

The service application program can be a service application program for providing a service in a server of a service platform. The service can be a service provided by the server of the service platform to a user, for example, a query service and a payment service. The service can alternatively be a service provided by the server of the service platform to another server, for example, a settlement service.

Certainly, it can be learned from the above-mentioned descriptions that, to decouple the program of the aspect-oriented security service from the service application program, in this specification, the program of the aspect-oriented security service and the service application program are interleaved in an aspect-oriented programming manner during service execution, and are independently maintained in parallel with each other. Therefore, different from a service provider of a service application program, a third party providing an aspect-oriented security service can manage, by using the server, content related to the aspect-oriented security service, for example, configuration of an aspect-oriented security service management and control policy, version iteration of the aspect program, and deployment rule configuration of the aspect program. Certainly, the third party or the service provider can provide an aspect-oriented security service.

When managing content related to the aspect-oriented security service, the server can record various configuration information such as configuration of various policies and the deployment rule configuration of the aspect program by using a configuration file. The aspect base can deploy the aspect program based on the configuration file, or the server can implement the aspect-oriented security service based on the configuration file.

In actual application, the service provider is usually provided with an equipment room that includes several physical machines or physical servers to provide, by using the physical machines, physical resources needed by the service application program. Certainly, a service application program may not need all physical resources of an entire physical machine. Therefore, usually, a plurality of virtual hosts (virtual host) run on one physical machine by using a virtualization technology. Various virtual hosts are independent of each other, and each enjoy some physical resources of the physical machine. Then, an application container can be deployed in the virtual host, and the service application program can run by using the application container. The application container usually includes physical resources allocated to the application container, for example, a CPU and a memory, and a running environment provided to the application container, for example, an operating system (OS) or other running environment data, such as a serial number (SN) of the container, an allocated IP (Influential Property), an application name, a tenant, and an environment variable. The service application program can be deployed in the application container to execute a service.

In a scenario of executing a service based on aspect-oriented security, a service provider or a third party providing an aspect-oriented security service can provide a server. Content related to the aspect-oriented security service is managed by using the server. The aspect base is deployed in the application container. The aspect program is injected into the service application program in the service application container by using the aspect base, to provide support for the aspect-oriented security service for the application container of the service provider.

Therefore, the aspect base can be deployed in the application container of the service provider in advance. Usually, when the application container is started, an operating system provided for the application container can be evoked, and the aspect base deployed in advance can run. The injection points of the aspect program and the service application program are obtained from the server by using the aspect base. The aspect program is injected from the injection point of the service application program in the application container. In addition, in a process of executing the service application program, the aspect base can obtain the injection points of the aspect program and the service application program from the server, and inject the aspect program from the injection point of the service application program in the application container.

Certainly, how the aspect base obtains, from the server, information needed for deploying the aspect program can be set as required. For example, needed information can be actively pulled from the server based on the configuration file, or the server can actively deliver needed information received by the aspect base.

After the aspect program is injected from the injection point of the service application program, the service application program can trigger the aspect program in an execution process, to implement a corresponding function of the aspect-oriented security service.

The aspect-oriented security on the mobile terminal is aspect-oriented security running on the mobile terminal, and is configured to inject the aspect program from the injection point of the service application program (that is, an APP) on the mobile terminal, to perform security control and management on the service application program on the mobile terminal. The server application runs on the controllable server. Differently, the aspect-oriented security on the mobile terminal runs on the terminal device of the user. The running environment is untrusted. The aspect-oriented security on the mobile terminal may be attacked in a running process, resulting in insecurity.

To ensure security of the aspect-oriented security on the mobile terminal at the mobile terminal, as shown in FIG. 1, an embodiment of this application provides a mobile-terminal aspect-oriented security protection method. The method is applied to a virtual machine disposed on a mobile terminal. The virtual machine is configured to run the aspect-oriented security on the mobile terminal. The method includes the following steps 100 to 300.

Step 100: After a service application program installed on the mobile terminal is started, the virtual machine determines whether the aspect-oriented security on the mobile terminal satisfies a secure running condition. If yes, perform step 200; or otherwise, perform step 300.

In related technologies, the aspect-oriented security on the mobile terminal runs in an operating system of the mobile terminal. A basic function (for example, a hash algorithm, memory symbol searching, and encryption/decryption) of the aspect-oriented security on the mobile terminal needs to be implemented by calling an API in a system library. The operating system of the mobile terminal may be hijacked by an attacker. As a result, an attacker implements HOOK on or a replaced system library hijacks the aspect program when the aspect-oriented security on the mobile terminal runs. Therefore, a protected customized virtual machine (VMP) can be disposed on the mobile terminal, and is configured to run the aspect-oriented security on the mobile terminal. A basic function of the aspect-oriented security on the mobile terminal is implemented by a function in a trusted underlying library of the virtual machine. The API in the system library is not called. As such, even if the attacker hijacks the operating system, the virtual machine cannot be attacked, thereby ensuring security of the aspect-oriented security on the mobile terminal.

After the service application program on the mobile terminal is started, the virtual machine starts to run. Then, it is determined, by using the virtual machine, whether the aspect-oriented security on the mobile terminal satisfies the secure running condition. If yes, it indicates that a running environment of the aspect-oriented security on the mobile terminal is secure and can be started. Otherwise, it indicates that a running environment of the aspect-oriented security on the mobile terminal may be attacked by an attacker, and therefore cannot be started. In addition, the service application program also needs to be exited, to prevent the attacker from further attacking the service application program.

In some embodiments, that the virtual machine determines whether the aspect-oriented security on the mobile terminal satisfies the secure running condition specifically includes: performing, by using the virtual machine, integrity check on the aspect-oriented security on the mobile terminal, where if the check succeeds, the aspect-oriented security on the mobile terminal satisfies the secure running condition; or otherwise, the aspect-oriented security on the mobile terminal does not satisfy the secure running condition.

Integrity check indicates to calculate integrity of a file by using various algorithms to prevent the file from being modified, for example, determine, by calculating a CRC32 value of the file or a hash value of the file, whether the file is modified. In some embodiments, integrity check can be performed by calculating hash values of various files of the aspect-oriented security on the mobile terminal, for example, by calculating hash values of the aspect-oriented security on the mobile terminal such as a signature, a configuration file, and a package name, and then comparing the hash value with a pre-stored standard hash value (that is, a hash value of a file that is not tampered with). If the two match, it indicates that the signature, the configuration file, the package name, etc. of the aspect-oriented security on the mobile terminal are not tampered with, and integrity check succeeds; or otherwise, it indicates that the signature, the configuration file, the package name, etc. of the aspect-oriented security on the mobile terminal have been tampered with, and integrity check does not succeed.

Because integrity check runs by using the virtual machine, the API in the system library does not need to be called, to avoid a case in which the operating system returns a result set by the attacker instead of a real result after being hijacked by the attacker, thereby ensuring integrity of the aspect-oriented security on the mobile terminal before being started and avoiding starting of the aspect-oriented security on the mobile terminal when the aspect-oriented security is tampered with. For example, when there is no virtual machine, the API in the system library needs to be called in the integrity check to calculate the hash value of the file and match the hash value with the standard hash value. If the operating system is hijacked by the attacker, the attacker can return the result set by the attacker instead of the real result. For example, the real result is mismatching, and the integrity check fails. However, the attacker can enable the API in the system library to return a matching result. As such, the integrity check can succeed, so that the aspect-oriented security on the mobile terminal is started. The attacker attacks the aspect-oriented security on the mobile terminal, and attacks the service application program by using the aspect-oriented security on the mobile terminal. When integrity check is performed by using the virtual machine, the virtual machine does not need to call the API in the system library, but relies on a trusted underlying library of the virtual machine. Therefore, even if the operating system is hijacked, a correct result can be returned when integrity check is performed, to ensure that the aspect-oriented security on the mobile terminal is started under the secure running condition.

In some other embodiments, determining whether the aspect-oriented security on the mobile terminal satisfies the secure running condition specifically includes: determining whether the mobile terminal encounters jailbreak/ROOT, and/or determining whether injection/HOOK occurs on the aspect-oriented security on the mobile terminal, where if yes, the aspect-oriented security on the mobile terminal satisfies the secure running condition; or otherwise, the aspect-oriented security on the mobile terminal does not satisfy the secure running condition.

In some embodiments, the integrity check can be performed by using the virtual machine first. If the integrity check succeeds, it is further determined whether the mobile terminal encounters jailbreak/ROOT and/or whether injection/HOOK occurs on the aspect-oriented security on the mobile terminal. If the mobile terminal does not encounter jailbreak/ROOT and injection/HOOK does not occur on the aspect-oriented security on the mobile terminal, it indicates that the aspect-oriented security on the mobile terminal satisfies the secure running condition. If the integrity check fails, it may be determined that the aspect-oriented security on the mobile terminal does not satisfy the secure running condition, and it is not necessary to further determine whether the mobile terminal encounters jailbreak/ROOT or whether injection/HOOK occurs on the aspect-oriented security on the mobile terminal. If the integrity check succeeds, and the mobile terminal encounters jailbreak/ROOT or injection/HOOK occurs on the aspect-oriented security on the mobile terminal, it may be determined that the aspect-oriented security on the mobile terminal does not satisfy the security running condition.

Jailbreak/ROOT indicates to obtain the highest authority of a system of the mobile terminal. After the mobile terminal encounters jailbreak/ROOT, the attacker can obtain any information of the user or perform any operation on the mobile terminal, resulting in risks such as privacy leakage. After the mobile terminal encounters jailbreak/ROOT, the attacker leaves many high-risk files in a memory of the mobile terminal to store related configuration information. Therefore, whether the mobile terminal encounters jailbreak/ROOT can be determined by detecting whether these high-risk files exist. Specifically, when it is detected that the high-risk files exist in the memory of the mobile terminal, it indicates that the mobile terminal encounters jailbreak/ROOT. Otherwise, it indicates that the mobile terminal does not encounter jailbreak/ROOT.

HOOK is also referred to as a hook, and is a technology that can implement a substitution function to call an entry address. Injection indicates a process in which an attacker injects a third party library implemented by the attacker into the service application program. The attacker usually replaces, by using a combination of injection and HOOK technologies, an entry address of a target function with a function address of the third party library injected by the attacker, to change original functions of a function in the service application program. To detect whether the aspect-oriented security on the mobile terminal encounters a risk of injection/HOOK, entry addresses of all functions (or key functions) in the aspect-oriented security on the mobile terminal can be traversed. Then, it is detected whether the entry address and the aspect-oriented security on the mobile terminal are in the same memory address space. If an entry address of a specific function is not in the same memory address space as the aspect-oriented security on the mobile terminal, but is changed to memory address space of the third party library of the attacker, it indicates that the function encounters injection/HOOK, that is, the aspect-oriented security on the mobile terminal encounters injection/HOOK. If all the traversed entry addresses of the functions are in the same memory address space as the aspect-oriented security on the mobile terminal, it indicates that no function encounters injection/HOOK, that is, the aspect-oriented security on the mobile terminal does not encounter injection/HOOK.

Step 200: Acquire an encrypted aspect configuration, decrypt the encrypted aspect configuration, and inject an aspect program into the service application program based on the decrypted aspect configuration by using a predetermined aspect base, to execute an aspect-oriented security service by using the aspect program.

If the aspect-oriented security on the mobile terminal satisfies the secure running condition, it indicates that a running environment of the mobile terminal is secure and therefore can be started. In this case, the encrypted aspect configuration can be acquired by using the virtual machine, and the encrypted aspect configuration is decrypted to obtain the decrypted aspect configuration. Then, the aspect program is injected into the service application program based on the decrypted aspect configuration by using the predetermined aspect base of the aspect-oriented security on the mobile terminal, to execute the aspect-oriented security service by using the aspect program.

In the related technologies, the aspect configuration is usually delivered to the aspect base by using the server, and then the aspect base injects the aspect program into the service application program based on the aspect configuration. The aspect configuration is usually a plaintext file in a JSON format. When the aspect configuration is delivered to the aspect base, the attacker may illegally call the aspect configuration, thereby causing insecurity. Therefore, in some embodiments, encryption processing can be first performed on the aspect configuration in the server. A salt-added symmetric encryption algorithm or another encryption algorithm can be used in an encryption manner. Then, the server delivers the encrypted aspect configuration to the virtual machine. The virtual machine decrypts the encrypted aspect configuration to obtain the decrypted aspect configuration, and then sends the decrypted aspect configuration to the aspect base. The aspect base injects the aspect program into the service application program based on the decrypted aspect configuration. Decryption and transmission of the decrypted aspect configuration are both implemented by using the virtual machine, to prevent the decrypted aspect configuration from being illegally called by the attacker in the operating system, thereby reducing an attack surface.

Step 300: Exit a service application program.

If the aspect-oriented security on the mobile terminal does not satisfy the secure running condition, it indicates that the running environment of the aspect-oriented security on the mobile terminal is insecure, and the aspect-oriented security on the mobile terminal may be attacked and therefore cannot be started. To prevent the attacker from further attacking the service application program, the service application program can be exited.

An object corresponding to the decrypted aspect configuration exists in the memory. After the decrypted aspect configuration is sent to the aspect base, the decrypted aspect configuration is loaded into the memory, and then the aspect base obtains a value of the object corresponding to the decrypted aspect configuration when performing an operation based on the decrypted aspect configuration. For example, a specific configuration in the decrypted aspect configuration controls on/off of a specific function. An object corresponding to the configuration in the memory has an attribute. The attribute returns a value. If the value is true, it indicates that the function is on. If the value is false, it indicates that the function is off. The object corresponding to the decrypted aspect configuration may be tampered with, so that the aspect program performs an operation set by the attacker, thereby causing insecurity. Therefore, in some embodiments, after the aspect program is injected into the service application program (that is, when the aspect-oriented security on the mobile terminal runs), regular check can be further performed on the object corresponding to the decrypted aspect configuration, to determine whether the object is tampered with. If yes, the service application program is exited, to prevent the service application program from being attacked. Otherwise, the aspect program continues to perform the aspect-oriented security service.

In some embodiments, a hash value can be obtained for the object corresponding to the decrypted aspect configuration. Then, regular comparison can be performed between the hash value and a pre-stored standard hash value. If the two hash values match, it indicates that the object corresponding to the decrypted aspect configuration is not tampered with. Otherwise, it indicates that the object corresponding to the decrypted aspect configuration is tampered with. As such, regular check is performed on the object. A frequency of the regular check can be set as required. For example, check is performed once in every 10 minutes or any other expected time period.

After the aspect program is injected into the service application program, the aspect program may be hijacked to execute a service set by the attacker. Therefore, in some embodiments, a stack called by using the aspect program can be regularly traced, and whether the aspect program is hijacked can be determined; and if yes, the service application program is exited, to prevent the service application program from being attacked; or otherwise, the aspect program is enabled to continue to execute the aspect-oriented security service, that is, the aspect-oriented security on the mobile terminal continues running.

When executing the security service, the aspect program needs to call many methods. If the aspect program is hijacked, the aspect program calls a function in a library of the attacker. Therefore, the library of the attacker appears in a call stack of the aspect program. Otherwise, the library of the attacker does not appear in the call stack. Thus, in some embodiments, the call stack for the aspect program can be regularly traced (for example, once in every 10 minutes or any other expected time period); and if the library of the attacker exists in the call stack, it indicates that the aspect program is hijacked; or otherwise, it indicates that the aspect program is not hijacked.

In some embodiments, when the service application program is exited, a corresponding exit reason can be further reported to the server. For example, when the service application program is exited due to an integrity check failure, the information can be reported to the server. When the service application program is exited because the mobile terminal encounters jailbreak/ROOT and/or injection/HOOK occurs on the aspect-oriented security on the mobile terminal, the corresponding information can be reported to the server. When the service application program is exited because the object corresponding to the decrypted aspect configuration is tampered with, the object that is tampered with is reported to the server. When the service application program is exited because the aspect-oriented security on the mobile terminal is hijacked during running, the information is reported to the server.

According to the mobile-terminal aspect-oriented security protection methods in embodiments of this application, the virtual machine is used to determine whether the aspect-oriented security on the mobile terminal satisfies the secure running condition, start the aspect-oriented security on the mobile terminal when the secure running condition is satisfied, and not start the aspect-oriented security on the mobile terminal and exit the service application program when the secure running condition is not satisfied, to prevent the aspect-oriented security on the mobile terminal and the service application program from being attacked. The aspect configuration is changed from a plaintext to an encrypted ciphertext. The virtual machine is used to decrypt the encrypted ciphertext. As such, the following case is avoided: The plaintext aspect configuration is illegally called in an operating system by an attacker. Whether the aspect program is hijacked or whether the object corresponding to the encrypted aspect configuration is tampered with is regularly determined, to protect the aspect-oriented security on the mobile terminal during running.

As shown in FIG. 2, another embodiment of this application provides a mobile-terminal aspect-oriented security protection apparatus. A virtual machine configured to run aspect-oriented security on a mobile terminal is disposed on the mobile terminal. The apparatus runs in the virtual machine, and includes a determining module 10, a start module 20, and an exit module 30. After a service application program installed on the mobile terminal is started, the determining module 10 first determines, by using the virtual machine, whether the aspect-oriented security on the mobile terminal satisfies a secure running condition. If yes, the start module 20 acquires, by using the virtual machine, an encrypted aspect configuration, decrypts the encrypted aspect configuration, and injects an aspect program into the service application program based on the decrypted aspect configuration by using a predetermined aspect base, to execute an aspect-oriented security service by using the aspect program, that is, enable the aspect-oriented security on the mobile terminal to be started. Otherwise, the exit module 30 exits the service application program. In this case, the aspect-oriented security on the mobile terminal is not started, and the service application program is exited, to prevent the service application program from being attacked because the aspect-oriented security on the mobile terminal is insecure.

In some embodiments, that the virtual machine determines whether the aspect-oriented security on the mobile terminal satisfies the secure running condition specifically includes: performing, by using the virtual machine, integrity check on the aspect-oriented security on the mobile terminal, where if the check succeeds, the aspect-oriented security on the mobile terminal satisfies the secure running condition; or otherwise, the aspect-oriented security on the mobile terminal does not satisfy the secure running condition.

In some embodiments, integrity check can be performed by calculating hash values of various files of the aspect-oriented security on the mobile terminal, for example, by calculating hash values of the aspect-oriented security on the mobile terminal such as a signature, a configuration file, and a package name, and then comparing the hash value with a pre-stored standard hash value (that is, a hash value of a file that is not tampered with). If the two match, it indicates that the signature, the configuration file, the package name, etc. of the aspect-oriented security on the mobile terminal are not tampered with, and integrity check succeeds; or otherwise, it indicates that the signature, the configuration file, the package name, etc. of the aspect-oriented security on the mobile terminal have been tampered with, and integrity check does not succeed.

Because integrity check runs by using the virtual machine, the API in the system library does not need to be called, to avoid a case in which the operating system returns a result set by the attacker instead of a real result after being hijacked by the attacker, thereby ensuring integrity of the aspect-oriented security on the mobile terminal before being started and avoiding starting of the aspect-oriented security on the mobile terminal when the aspect-oriented security is tampered with.

In some other embodiments, determining whether the aspect-oriented security on the mobile terminal satisfies the secure running condition specifically includes: determining whether the mobile terminal encounters jailbreak/ROOT, and/or determining whether injection/HOOK occurs on the aspect-oriented security on the mobile terminal, where if yes, the aspect-oriented security on the mobile terminal satisfies the secure running condition; or otherwise, the aspect-oriented security on the mobile terminal does not satisfy the secure running condition.

In some embodiments, the determining module 10 can first perform integrity check by using the virtual machine; and if the integrity check succeeds, further determine whether the mobile terminal encounters jailbreak/ROOT and/or whether injection/HOOK occurs on the aspect-oriented security on the mobile terminal. If the mobile terminal does not encounter jailbreak/ROOT and injection/HOOK does not occur on the aspect-oriented security on the mobile terminal, it indicates that the aspect-oriented security on the mobile terminal satisfies the secure running condition. If the integrity check fails, it may be determined that the aspect-oriented security on the mobile terminal does not satisfy the secure running condition, and it is not necessary to further determine whether the mobile terminal encounters jailbreak/ROOT or whether injection/HOOK occurs on the aspect-oriented security on the mobile terminal. If the integrity check succeeds, and the mobile terminal encounters jailbreak/ROOT or injection/HOOK occurs on the aspect-oriented security on the mobile terminal, it may be determined that the aspect-oriented security on the mobile terminal does not satisfy the security condition.

Jailbreak/ROOT indicates to obtain the highest authority of a system of the mobile terminal. After the mobile terminal encounters jailbreak/ROOT, the attacker can obtain any information of the user or perform any operation on the mobile terminal, resulting in risks such as privacy leakage. After the mobile terminal encounters jailbreak/ROOT, the attacker leaves many high-risk files in a memory of the mobile terminal to store related configuration information. Therefore, the determining module 10 can determine, by using the virtual machine by detecting whether these high-risk files exist, whether the mobile terminal encounters jailbreak/ROOT. Specifically, when it is detected that the high-risk files exist in the memory of the mobile terminal, it indicates that the mobile terminal encounters jailbreak/ROOT. Otherwise, it indicates that the mobile terminal does not encounter jailbreak/ROOT.

To detect whether the aspect-oriented security on the mobile terminal encounters a risk of injection/HOOK, the determining module 10 can traverse, by using the virtual machine, entry addresses of all functions (or key functions)

in the aspect-oriented security on the mobile terminal; and then, detect whether the entry address and the aspect-oriented security on the mobile terminal are in the same memory address space. If an entry address of a specific function is not in the same memory address space as the aspect-oriented security on the mobile terminal, but is changed to memory address space of the third party library of the attacker, it indicates that the function encounters injection/HOOK, that is, the aspect-oriented security on the mobile terminal encounters injection/HOOK. If all the traversed entry addresses of the functions are in the same memory address space as the aspect-oriented security on the mobile terminal, it indicates that no function encounters injection/HOOK, that is, the aspect-oriented security on the mobile terminal does not encounter injection/HOOK.

If the aspect-oriented security on the mobile terminal satisfies the secure running condition, it indicates that a running environment of the mobile terminal is secure and therefore can be started. In this case, the start module 20 can acquire the encrypted aspect configuration by using the virtual machine, and decrypt the encrypted aspect configuration to obtain the decrypted aspect configuration; and then, inject the aspect program into the service application program based on the decrypted aspect configuration by using the predetermined aspect base of the aspect-oriented security on the mobile terminal, to execute the aspect-oriented security service by using the aspect program.

In the related technologies, the aspect configuration is usually delivered to the aspect base by using the server, and then the aspect base injects the aspect program into the service application program based on the aspect configuration. The aspect configuration is usually a plaintext file in a JSON format. When the aspect configuration is delivered to the aspect base, the attacker may illegally call the aspect configuration, thereby causing insecurity. Therefore, in some embodiments, encryption processing can be first performed on the aspect configuration in the server. A salt-added symmetric encryption algorithm or another encryption algorithm can be used in an encryption manner. Then, the server delivers the encrypted aspect configuration to the start module 20. The start module 20 decrypts, by using the virtual machine, the encrypted aspect configuration to obtain the decrypted aspect configuration, and then sends the decrypted aspect configuration to the aspect base. The aspect base injects the aspect program into the service application program based on the decrypted aspect configuration. Decryption and transmission of the decrypted aspect configuration are both implemented by using the virtual machine, to prevent the decrypted aspect configuration from being illegally called by the attacker in the operating system, thereby reducing an attack surface.

If the aspect-oriented security on the mobile terminal does not satisfy the secure running condition, it indicates that the running environment of the aspect-oriented security on the mobile terminal is insecure, and the aspect-oriented security on the mobile terminal may be attacked and therefore cannot be started. To prevent the attacker from further attacking the service application program, the exit module 30 can exit the service application program.

In some embodiments, after the aspect program is injected into the service application program (that is, when the aspect-oriented security on the mobile terminal runs), the start module 20 can be further configured to: perform regular check on the object corresponding to the decrypted aspect configuration, to determine whether the object is tampered with; and if yes, exit the service application program, to prevent the service application program from being attacked; or otherwise, enable the aspect program to continue to perform the aspect-oriented security service.

In some embodiments, a hash value can be obtained for the object corresponding to the decrypted aspect configuration. Then, regular comparison can be performed between the hash value and a pre-stored standard hash value. If the two hash values match, it indicates that the object corresponding to the decrypted aspect configuration is not tampered with. Otherwise, it indicates that the object corresponding to the decrypted aspect configuration is tampered with. As such, regular check is performed on the object. A frequency of the regular check can be set as required. For example, check is performed once in every 10 minutes or any other expected time period.

After the aspect program is injected into the service application program, the aspect program may be hijacked to execute a service set by the attacker. Therefore, in some embodiments, the start module 20 can be further configured to: regularly trace a stack called by using the aspect program, and determine whether the aspect program is hijacked; and if yes, exit the service application program, to prevent the service application program from being attacked; or otherwise, enable the aspect program to continue to execute the aspect-oriented security service, that is, the aspect-oriented security on the mobile terminal continues running.

When executing the security service, the aspect program needs to call many methods. If the aspect program is hijacked, the aspect program calls a function in a library of the attacker. Therefore, the library of the attacker appears in a call stack of the aspect program. Otherwise, the library of the attacker does not appear in the call stack. Thus, in some embodiments, the call stack for the aspect program can be regularly traced (for example, once in every 10 minutes or any other expected time period); and if the library of the attacker exists in the call stack, it indicates that the aspect program is hijacked; or otherwise, it indicates that the aspect program is not hijacked.

In some embodiments, when the service application program is exited, a corresponding exit reason can be further reported to the server. For example, when the service application program is exited due to an integrity check failure, the exit module 30 can report the information to the server. When the service application program is exited because the mobile terminal encounters jailbreak/ROOT and/or injection/HOOK occurs on the aspect-oriented security on the mobile terminal, the exit module 30 can report the corresponding information to the server. When the service application program is exited because the object corresponding to the decrypted aspect configuration is tampered with, the exit module 30 can report the object that is tampered with to the server. When the service application program is exited because the aspect-oriented security on the mobile terminal is hijacked during running, the exit module 30 can report the information to the server.

According to the mobile-terminal aspect-oriented security protection apparatuses in embodiments of this application, the determining module 10 determines, by using the virtual machine, whether the aspect-oriented security on the mobile terminal satisfies the secure running condition, start the aspect-oriented security on the mobile terminal when the secure running condition is satisfied, and not start the aspect-oriented security on the mobile terminal and exit the service application program when the secure running condition is not satisfied, to prevent the aspect-oriented security on the mobile terminal and the service application program from being attacked. The aspect configuration is changed from a plaintext to an encrypted ciphertext. The start module

20 decrypts, by using the virtual machine, the encrypted ciphertext. As such, the following case is avoided: The plaintext aspect configuration is illegally called in an operating system by an attacker. The start module 20 regularly determines whether the aspect program is hijacked or whether the object corresponding to the encrypted aspect configuration is tampered with, to protect the aspect-oriented security on the mobile terminal during running.

Still another embodiment of this application provides a readable storage medium storing a computer program. When the computer program is executed in a computer, the computer is enabled to perform steps in the above-mentioned mobile-terminal aspect-oriented security protection method in the above-mentioned embodiments of this application.

Still another embodiment of this application provides an electronic device including a memory and a processor. The memory stores executable code. When the processor executes the executable code, the processor performs steps in the above-mentioned mobile-terminal aspect-oriented security protection method in the above-mentioned embodiments of this application.

The systems, apparatuses, modules, or units described in the above-mentioned embodiments can be specifically implemented by a computer chip or an entity, or can be implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the above-mentioned apparatus is described by dividing functions into various units. Certainly, during implementation of this application, functions of units can be implemented in the same or more software and/or hardware.

A person skilled in the art should understand that one or more embodiments of this application can be provided as a method, a system, or a computer program product. Therefore, this application can use a form of hardware only embodiments, software only embodiments, or embodiments with a combination of software and hardware. Moreover, a form of a computer program product that is implemented on one or more computer-usable storage media (including but not limited to a disk memory, a CD-ROM, an optical memory, etc.) that include computer-usable program code can be used in this application.

This application is described with reference to the flowcharts and/or block diagrams of the method, the device (system), and the computer program product based on the embodiments of this application. It should be understood that computer program instructions can be used to implement each procedure and/or each block in the flowcharts and/or the block diagrams and a combination of a procedure and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions can also be stored in a computer-readable memory that can instruct a computer or another programmable data processing device to work in a specific manner, so that an instruction stored in the computer-readable memory generates a manufacturer including an instruction apparatus, and the instruction apparatus implements a function specified in one or more procedures of a flowchart and/or one or more blocks of a block diagram.

The computer program instructions can alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

In a typical configuration, the computing device includes one or more processors (CPU), input/output interfaces, network interfaces, and memory.

The memory may include a form such as a non-permanent memory, a random access memory (RAM), or a non-volatile memory in a computer-readable medium, for example, a read-only memory (ROM) or a flash memory (flash RAM). The memory is an example of the computer-readable medium.

The computer-readable medium includes a persistent and a non-persistent, a removable and a non-removable medium, which implement information storage by using any method or technology. The information can be computer-readable instructions, a data structure, a program module, or other data. Examples of the storage medium of the computer include but are not limited to a phase-change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disk (DVD) or another optical storage, a magnetic cassette tape, a magnetic disk storage or another magnetic storage device, or any other non-transmission medium, which can be configured to store information accessible to a computing device. As specified in this specification, the computer-readable medium does not include transitory computer-readable media (transitory media), such as a modulated data signal and a carrier.

It is worthwhile to further note that the terms "include", "comprise", or any other variant thereof are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that embodiments of this application can be provided as a method, a system, or a computer program product. Therefore, this application can use a form of hardware only embodiments, software only embodiments, or embodiments with a combination of software and hardware. Moreover, a form of a computer program product that is implemented on one or more computer-usable storage media (including but not limited to a disk memory, a CD-ROM, an optical memory, etc.) that include computer-usable program code can be used in this application.

This application can be described in a general context of a computer-executable instruction executed by a computer, for example, a program module. Generally, the program module includes a routine, a program, an object, a component, a data structure, etc. executing a specific task or implementing a specific abstract data type. This application can also be practiced in a distributed computing environment in which tasks are performed by remote processing devices connected via a communication network. In the distributed computing environments, the program module can be located in both local and remote computer storage media including storage devices.

Embodiments in this application are all described in a progressive manner. For same or similar parts in embodiments, reference may be made to these embodiments. Each embodiment focuses on a difference from other embodiments. In particular, for the system embodiment, because the system or system embodiment is basically similar to the method embodiment, descriptions are relatively simple. For related parts, reference may be made to the descriptions in the method embodiment.

In short, the above-mentioned descriptions are merely example embodiments of this application, but are not intended to limit the scope of this application. Various changes can be further made to the above-mentioned embodiments of this application. To be specific, all simple equivalent changes and modifications made according to the claims and the content of this specification of this application fall within the protection scope of the claims of this application. Content that is not described in detail in this application is conventional technical content.

What is claimed is:

1. A method for mobile-terminal aspect-oriented security protection, wherein the method is applied to a virtual machine disposed on a mobile terminal, the virtual machine is configured to run aspect-oriented security on the mobile terminal, and the method comprises:

after a service application program installed on the mobile terminal is started, determining, by the virtual machine, whether the aspect-oriented security on the mobile terminal satisfies a secure running condition; and in response to determining that the aspect-oriented security on the mobile terminal satisfies a secure running condition, acquiring an encrypted aspect configuration;

decrypting the encrypted aspect configuration; and injecting an aspect program into the service application program based on decrypted aspect configuration by using a predetermined aspect base to execute an aspect-oriented security service by using the aspect program.

2. The method according to claim 1, wherein the determining, by the virtual machine, whether the aspect-oriented security on the mobile terminal satisfies a secure running condition comprises:

performing, by the virtual machine, integrity check on the aspect-oriented security on the mobile terminal, in response to determining that the integrity check succeeds, determining the aspect-oriented security on the mobile terminal satisfies the secure running condition; or in response to determining that the integrity check fails, determining the aspect-oriented security on the mobile terminal does not satisfy the secure running condition.

3. The method according to claim 1, wherein the determining, by the virtual machine, whether the aspect-oriented security on the mobile terminal satisfies a secure running condition comprises:

determining, by the virtual machine, at least one of whether the mobile terminal encounters jailbreak/ROOT, or whether injection/HOOK occurs on the aspect-oriented security on the mobile terminal; and in response to determining that at least one of that the mobile terminal encounters jailbreak/ROOT or that injection/HOOK occurs on the aspect-oriented security on the mobile terminal, determining that the aspect-oriented security on the mobile terminal does not satisfy the secure running condition.

4. The method according to claim 1, wherein the determining, by the virtual machine, whether the aspect-oriented security on the mobile terminal satisfies a secure running condition comprises:

determining, by the virtual machine, whether the mobile terminal encounters jailbreak/ROOT;

determining, by the virtual machine, whether injection/HOOK occurs on the aspect-oriented security on the mobile terminal; and in response to determining that the mobile terminal does not encounter jailbreak/ROOT and injection/HOOK does not occur on the aspect-oriented security on the mobile terminal the aspect-oriented security on the mobile terminal, determining that the aspect-oriented security on the mobile terminal satisfies the secure running condition.

5. The method according to claim 1, wherein after the aspect program is injected into the service application program, the method further comprises:

performing regular check on an object corresponding to the decrypted aspect configuration;

determining whether the object is tampered with; and in response to determining that the object is tampered with, exiting the service application program; or in response to determining that the object is tampered with, enabling the aspect program to continue to execute the aspect-oriented security service.

6. The method according to claim 5, wherein the performing regular check on an object corresponding to the decrypted aspect configuration, and determining whether the object is tampered with comprise:

performing regular comparison between a hash value of the object corresponding to the decrypted aspect configuration and a pre-stored standard hash value; and in response to determining that the hash value of the object corresponding to the decrypted aspect configuration and the pre-stored standard hash value match, determining that the object is not tampered with; or in response to determining that the hash value of the object corresponding to the decrypted aspect configuration and the pre-stored standard hash value do not match, determining that the object is tampered with.

7. The method according to claim 1, wherein after the aspect program is injected into the service application program, the method further comprises:

tracing a stack called by using the aspect program;

determining whether the aspect program is hijacked when executing the aspect-oriented security service; and in response to determining that the aspect program is hijacked, exiting the service application program; or in response to determining that the aspect program is not hijacked, enabling the aspect program to continue to execute the aspect-oriented security service.

8. A computer-implemented device disposed in a virtual machine on a mobile terminal, wherein the virtual machine is configured to run aspect-oriented security on the mobile terminal, and the computer-implemented device comprises:

one or more processors; and one or more tangible, non-transitory, machine-readable media storing one or more instructions that, when executed by the one or more processors, perform one or more operations comprising:

after a service application program installed on the mobile terminal is started, determining, by the virtual machine, whether the aspect-oriented security on the mobile terminal satisfies a secure running condition; and in response to determining that the aspect-oriented security on the mobile terminal satisfies a secure running condition, acquiring an encrypted aspect configuration;

decrypting the encrypted aspect configuration; and injecting an aspect program into the service application program based on decrypted aspect configuration by using a predetermined aspect base to execute an aspect-oriented security service by using the aspect program.

9. The computer-implemented device according to claim 8, wherein the determining, by the virtual machine, whether the aspect-oriented security on the mobile terminal satisfies a secure running condition comprises:

performing, by the virtual machine, integrity check on the aspect-oriented security on the mobile terminal, in response to determining that the integrity check succeeds, determining the aspect-oriented security on the mobile terminal satisfies the secure running condition; or in response to determining that the integrity check fails, determining the aspect-oriented security on the mobile terminal does not satisfy the secure running condition.

10. The computer-implemented device according to claim 8, wherein the determining, by the virtual machine, whether the aspect-oriented security on the mobile terminal satisfies a secure running condition comprises:

determining, by the virtual machine, at least one of whether the mobile terminal encounters jailbreak/ROOT, or whether injection/HOOK occurs on the aspect-oriented security on the mobile terminal; and in response to determining that at least one of that the mobile terminal encounters jailbreak/ROOT or that injection/HOOK occurs on the aspect-oriented security on the mobile terminal, determining that the aspect-oriented security on the mobile terminal does not satisfy the secure running condition.

11. The computer-implemented device according to claim 8, wherein the determining, by the virtual machine, whether the aspect-oriented security on the mobile terminal satisfies a secure running condition comprises:

determining, by the virtual machine, whether the mobile terminal encounters jailbreak/ROOT;

determining, by the virtual machine, whether injection/HOOK occurs on the aspect-oriented security on the mobile terminal; and in response to determining that the mobile terminal does not encounter jailbreak/ROOT and injection/HOOK does not occur on the aspect-oriented security on the mobile terminal the aspect-oriented security on the mobile terminal, determining that the aspect-oriented security on the mobile terminal satisfies the secure running condition.

12. The computer-implemented device according to claim 8, wherein after the aspect program is injected into the service application program, the one or more operations further comprise:

performing regular check on an object corresponding to the decrypted aspect configuration;

determining whether the object is tampered with; and in response to determining that the object is tampered with, exiting the service application program; or in response to determining that the object is tampered with, enabling the aspect program to continue to execute the aspect-oriented security service.

13. The computer-implemented device according to claim 12, wherein the performing regular check on an object corresponding to the decrypted aspect configuration, and determining whether the object is tampered with comprise:

performing regular comparison between a hash value of the object corresponding to the decrypted aspect configuration and a pre-stored standard hash value; and in response to determining that the hash value of the object corresponding to the decrypted aspect configuration and the pre-stored standard hash value match, determining that the object is not tampered with; or in response to determining that the hash value of the object corresponding to the decrypted aspect configuration and the pre-stored standard hash value do not match, determining that the object is tampered with.

14. The computer-implemented device according to claim 8, wherein after the aspect program is injected into the service application program, the one or more operations further comprise:

tracing a stack called by using the aspect program;

determining whether the aspect program is hijacked when executing the aspect-oriented security service; and in response to determining that the aspect program is hijacked, exiting the service application program; or in response to determining that the aspect program is not hijacked, enabling the aspect program to continue to execute the aspect-oriented security service.

15. A non-transitory, computer-readable medium storing one or more instructions executable by a virtual machine on a mobile terminal, wherein the virtual machine is configured to run aspect-oriented security on the mobile terminal, and the one or more instructions are executable by the virtual machine to perform operations comprising:

after a service application program installed on the mobile terminal is started, determining, by the virtual machine, whether the aspect-oriented security on the mobile terminal satisfies a secure running condition; and in response to determining that the aspect-oriented security on the mobile terminal satisfies a secure running condition, acquiring an encrypted aspect configuration;

decrypting the encrypted aspect configuration; and injecting an aspect program into the service application program based on decrypted aspect configuration by using a predetermined aspect base to execute an aspect-oriented security service by using the aspect program.

16. The non-transitory, computer-readable medium according to claim 15, wherein the determining, by the virtual machine, whether the aspect-oriented security on the mobile terminal satisfies a secure running condition comprises:

performing, by the virtual machine, integrity check on the aspect-oriented security on the mobile terminal, in response to determining that the integrity check succeeds, determining the aspect-oriented security on the mobile terminal satisfies the secure running condition; or in response to determining that the integrity check fails, determining the aspect-oriented security on the mobile terminal does not satisfy the secure running condition.

17. The non-transitory, computer-readable medium according to claim 15, wherein the determining, by the virtual machine, whether the aspect-oriented security on the mobile terminal satisfies a secure running condition comprises:

determining, by the virtual machine, at least one of whether the mobile terminal encounters jailbreak/ROOT, or whether injection/HOOK occurs on the aspect-oriented security on the mobile terminal; and in response to determining that at least one of that the mobile terminal encounters jailbreak/ROOT or that injection/HOOK occurs on the aspect-oriented security on the mobile terminal, determining that the aspect-oriented security on the mobile terminal does not satisfy the secure running condition, or in response to determining that the mobile terminal does not encounter jailbreak/ROOT and injection/HOOK does not occur on the aspect-oriented security on the mobile terminal the aspect-oriented security on the mobile terminal, determining that the aspect-oriented security on the mobile terminal satisfies the secure running condition.

18. The non-transitory, computer-readable medium according to claim 15, wherein after the aspect program is injected into the service application program, the operations further comprise:

performing regular check on an object corresponding to the decrypted aspect configuration;

determining whether the object is tampered with; and in response to determining that the object is tampered with, exiting the service application program; or in response to determining that the object is tampered with, enabling the aspect program to continue to execute the aspect-oriented security service.

19. The non-transitory, computer-readable medium according to claim 18, wherein the performing regular check on an object corresponding to the decrypted aspect configuration, and determining whether the object is tampered with comprise:

performing regular comparison between a hash value of the object corresponding to the decrypted aspect configuration and a pre-stored standard hash value; and in response to determining that the hash value of the object corresponding to the decrypted aspect configuration and the pre-stored standard hash value match, determining that the object is not tampered with; or in response to determining that the hash value of the object corresponding to the decrypted aspect configuration and the pre-stored standard hash value do not match, determining that the object is tampered with.

20. The non-transitory, computer-readable medium according to claim 15, wherein after the aspect program is injected into the service application program, the operations further comprise:

tracing a stack called by using the aspect program;

determining whether the aspect program is hijacked when executing the aspect-oriented security service; and in response to determining that the aspect program is hijacked, exiting the service application program; or in response to determining that the aspect program is not hijacked, enabling the aspect program to continue to execute the aspect-oriented security service.

* * * * *